United States Patent [19]

Barnes

[11] Patent Number: 4,795,547

[45] Date of Patent: Jan. 3, 1989

[54] PROCESS FOR CONTACTING PARTICULATE SOLIDS WITH A FLUID

[75] Inventor: Peter H. Barnes, The Hague, Netherlands

[73] Assignee: Shell Oil Company, Houston, Tex.

[21] Appl. No.: 23,322

[22] Filed: Mar. 9, 1987

[30] Foreign Application Priority Data

Mar. 27, 1986 [GB] United Kingdom ............... 8607698

[51] Int. Cl.[4] ............................................. C10G 47/00
[52] U.S. Cl. .................................... 208/113; 208/120; 208/164
[58] Field of Search ............... 422/144, 146, 140, 214; 208/127, 157, 158, 159, 120, 164, 113; 239/427, 432, 428; 261/78 A

[56] References Cited

U.S. PATENT DOCUMENTS

| | | | |
|---|---|---|---|
| 3,071,540 | 1/1963 | McMahon et al. | 208/163 |
| 3,152,065 | 10/1964 | Sharp et al. | 208/157 |
| 4,427,537 | 1/1984 | Deam et al. | 422/140 |
| 4,555,328 | 11/1985 | Krambeck et al. | 422/140 |
| 4,562,646 | 12/1985 | Hays et al. | 422/140 |
| 4,563,334 | 1/1986 | Hays et al. | 422/140 |
| 4,687,642 | 8/1987 | Nielsen | 422/140 |

Primary Examiner—Peter Kratz

[57] ABSTRACT

Process for contacting solid cracking catalyst with a hydrocarbons-comprising mixture by introducing said fluid as a, preferably single, annular stream into a stream comprising the particulate solids.

3 Claims, 3 Drawing Sheets

PROCESS FOR CONTACTING PARTICULATE SOLIDS WITH A FLUID

FIELD OF THE INVENTION

The invention relates to a process and an apparatus for contacting particulate solids with a fluid.

BACKGROUND OF THE INVENTION

It is known to contact hydrocarbon oil with cracking catalyst particles by passing said hydrocarbon oil as an outer annular stream in a generally linear direction, imparting a centrifugal energy component to said stream and passing an inner gas stream concentrically with said outer stream through a restricted opening to bring said stream into contact with catalyst particles.

It would be advantageous, however, to reduce the relatively large pressure drop resulting from (i) the conversion of linear velocity of the hydrocarbon oil stream into a tangential velocity component corresponding to the afore-mentioned centrifugal energy component and (ii) the subsequent passage of said stream together with an at least partly unbroken inner gas stream through a restricted opening.

It has now been found that optimal mixing of a fluid with particulate solids can be attained with a relatively small pressure drop without requiring a separate inner fluid stream by introducing an annular fluid stream (preferably as a central, symmetrical, hollow-cone jet) directly into a solids stream.

SUMMARY OF THE INVENTION

The invention therefore relates to a process for cracking a hydrocarbonaceous fluid which comprises contacting the hydrocarbonaceous fluid with a solid cracking catalyst and an apparatus for carrying out the process.

DESCRIPTION OF THE PREFERRED EMBODIMENTS

The present process can be carried out within a very wide temperature range provided, of course, that the fluid(s) applied does not solidify into large particles; preferably it is carried out at a temperature from 0°–800° C. and most preferably from 450°–550° C. The contacting process is generally carried out at elevated pressures, although (sub-)atmospheric pressures are not excluded, provided that a sufficient pressure difference is maintained to introduce the annular fluid stream into the solids stream; preferably it is carried out at a pressure from 1–100 bar abs., and most preferably from 2–6 bar abs. in conjunction with a catalytic cracking operation.

The ratio of mass flows of solids and fluids is preferably from 1–10 and most preferably from 4–8.

The invention further relates to an apparatus for contacting particulate solids with a fluid which comprises a solids container at least partly surrounding fluid supply means which have an inlet opening in the upstream end part and an annular fluid outlet opening in the downstream end part thereof.

Figure 1:
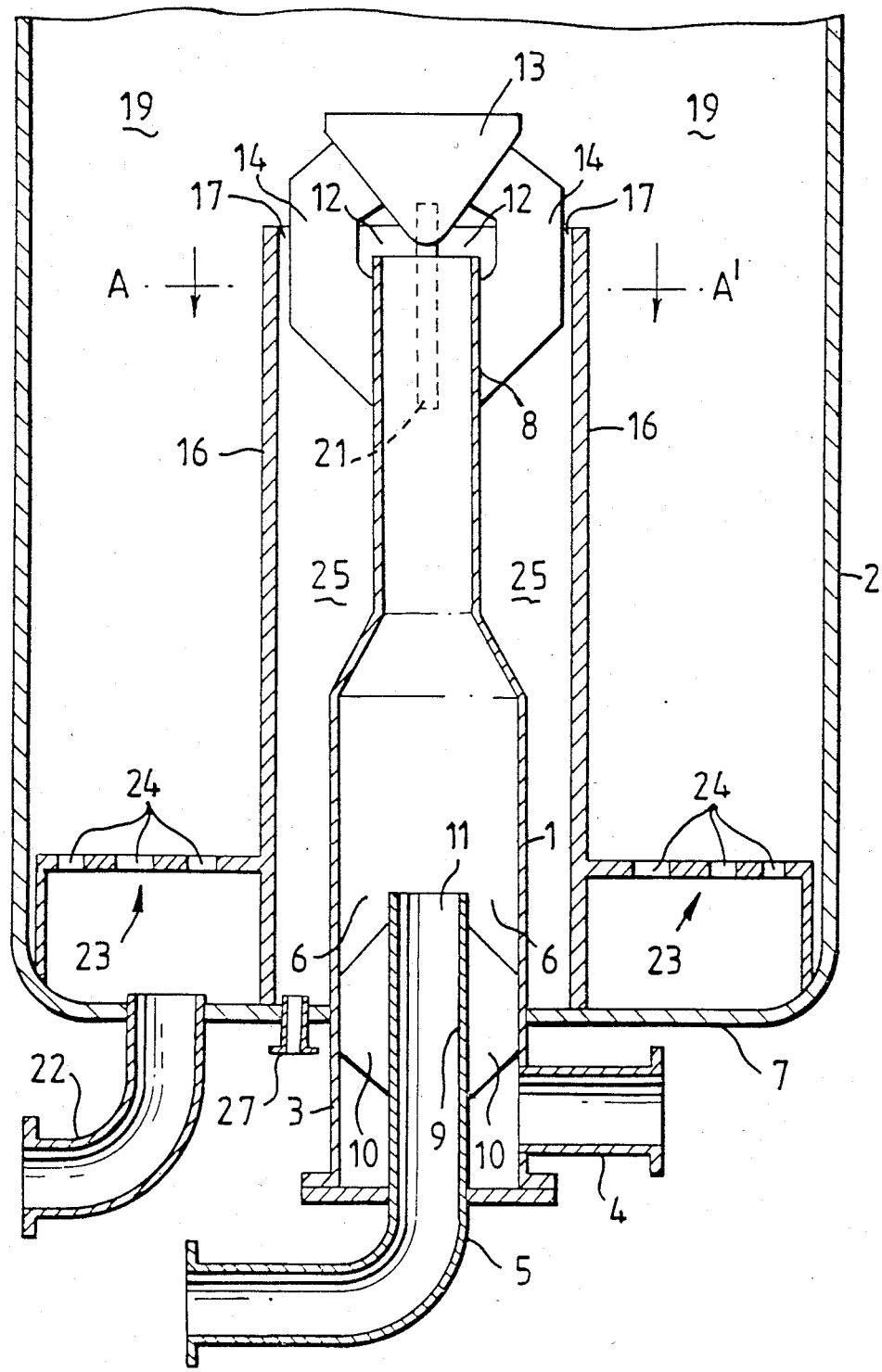
FIG. 1 represents a longitudinal section of an apparatus for contacting particulate solids with a fluid.

Referring now to FIG. 1, the apparatus as schematically depicted comprises fluid supply means (1) of which the major (downstream) part is surrounded by the bottom part of solids container (2). The upstream end part (3) of fluid supply means (1) preferably comprises separate inlet means (4) for a first fluid and most preferably tubular inlet means (5) for a second fluid arranged partly inside upstream end part (3). In the particularly preferred embodiment as shown in FIG. 1, an annular inlet opening (6) for the first fluid is defined between the wall of fluid supply means (1) and tubular inlet means (5) in order to accelerate an upwardly directed stream of the first fluid and to provide an excellent distribution thereof over the cross section of fluid supply means (1). Further acceleration and mixing of the first and second fluid can be attained by employing tubular fluid supply means (1) of which the cross sectional surface area decreases in downstream direction. Preferably, the ratio of the diameters of the upstream (3)—and downstream (8)—end parts of the tubular fluid supply means is from 1–5, and most preferably from 1.2–3.

A major advantage of the apparatus according to the invention is that a single tubular fluid supply means (1) arranged substantially centrally in the bottom end part (7) of solids container (2) can be applied to attain rapid, intimate and uniform mixing of particulate solids with fluid.

The downstream end part (9) of tubular inlet means (5) may comprise positioning means, such as outwardly directed spacer fins (10). At least one opening (11) is present in said downstream end part (9). In some cases, however, it can be advantageous to provide downstream end part (9) with a plurality (e.g. 4–12) of openings through which the second fluid will flow with a relatively high velocity (of e.g. 30–300 m/s) and accordingly increase the velocity of the fluid mixture flowing through fluid supply means (1).

The annular fluid outlet opening (12) is preferably defined between the wall of the downstream end part (8) of fluid supply means (1) and deflection means (13), which most preferably comprise a rotation-symmetrical body having an increasing diameter in downstream direction. In a particularly preferred embodiment of the apparatus according to the invention, deflection means (13) comprise a substantially conical body having a top angle of 30–180 degrees and preferably of 80–120 degrees. The ratio of the diameter of the base of said conical body and of the downstream end part (8) of fluid supply means (1) is preferably from 0.8–6 and most preferably from 1–4. Deflection means (13) can be held in place by connecting means (14) which may be arranged either inside or outside (shown in FIG. 1) the downstream end part (8) of fluid supply means (1). In the latter case, connecting means (14) can also serve as vanes inside annular opening (17) defined between tubular shielding means (16) and the downstream end part (8) of fluid supply means (1). A rod (21) may be arranged substantially coaxially inside fluid supply means (1) and connected to deflection means (13) in order to attain a very stable annular field flow around said rod.

The apparatus according to the present invention furthermore preferably comprises fluidization means

(23) (e.g. in the form of a perforated plate as depicted in FIG. 1 or ring-shaped or annular fluidization means) provided with regularly spaced fluidization gas openings (e.g. nozzles (24)) through which a fluidization gas (e.g. steam or a sour field catalytic cracking off gas) introduced via fluidization gas inlet means (22) emanates into mixing zone (19). Moreover, a separate flow of gas introduced via inlet means (27) may be used to cool space (25) between shielding means (16) and tubular fluid inlet means (1). Solids container (2) may comprise a section having a restricted diameter (not shown in the Figures) near annular fluid outlet opening (17) in order to increase the velocity of the fluidized bed of particulate solids surrounding said opening, thus even further improving the contact between the fluid (mixture) emanatng from fluid outlet opening (17) with the solids.

Figure 2:
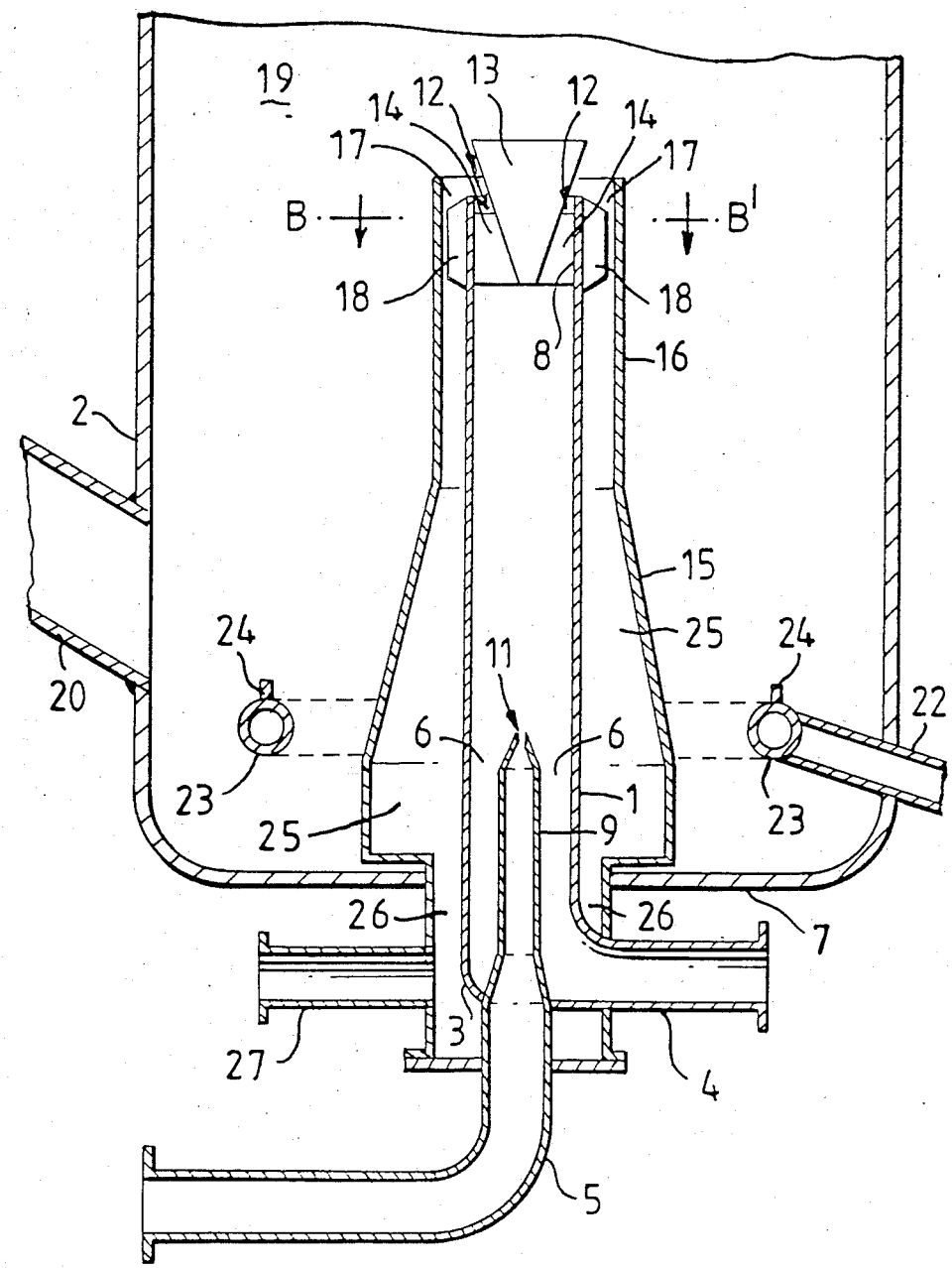
FIG. 2 represents a longitudinal section of the bottom part of a fluid catalytic cracking riser reactor.
Figure 3:
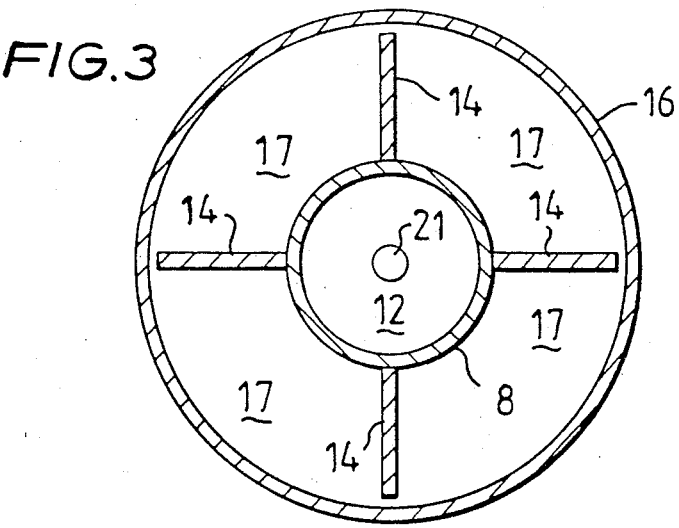
FIG. 3 represents a cross section at AA' of the fluid supply means of the apparatus as depicted in FIG. 1.
Figure 4:
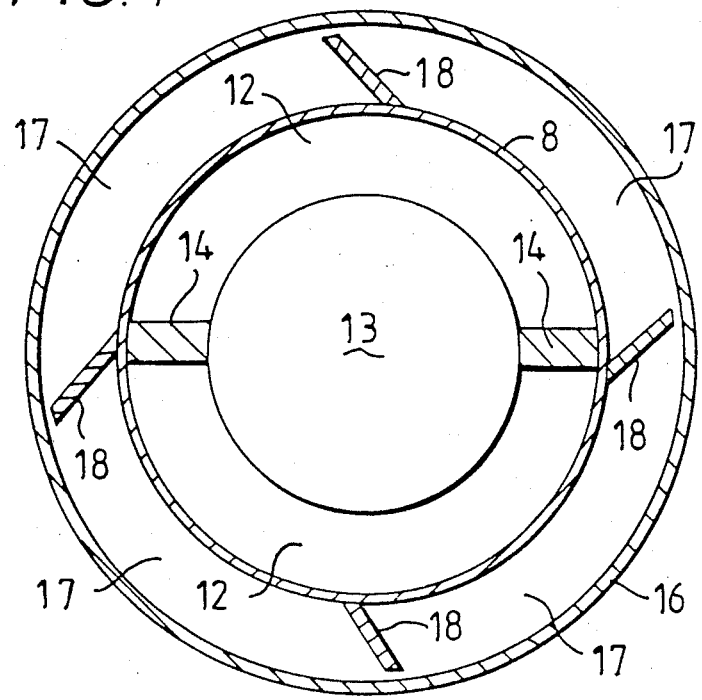
FIG. 4 represents a cross section at BB' of the fluid supply means arranged in the riser reactor section shown in FIG. 2.

In FIG. 2 another embodiment of the apparatus according to the invention is shown which is preferably employed as part of an apparatus for fluid catalytic cracking of hydrocarbonaceous material and which, in addition to the elements already described in connection with FIG. 1, comprises solids inlet means (20) through which solid particles (e.g. originating from a catalyst regenerator) are introduced into the bottom section of solids container (2) (which can be the riser reactor of a fluid catalytic cracking apparatus). A cooling gas (e.g. low pressure steam) can be introduced through cooling gas inlet means (27) and annular cooling gas inlet space (26) into space (25) (enclosed by lower-section (15) of shielding means (16)) and be removed through annular opening (17) provided with vanes (18). Preferably, a heavy hydrocarbon oil feed is introduced through inlet means (5) and accelerated through nozzle (11) in the downstream end part (9) thereof into fluid supply means (1) where mixing with steam introduced via inlet means (4) can take place.

The use of a single fluid/solid contacting apparatus which is centrally located in the bottom section of a riser reactor as depicted in FIG. 2 leads to very uniform mixing of solid cracking catalyst and fluid (hydrocarbon/steam mixture) in mixing zone (19) in a relatively short period of time; consequently the length of the riser reactor section in which the solid catalyst particles are mixed with hydrocarbon feed is relatively short, resulting in optimal use of the remaining (upper) section of the riser reactor for the actual catalytic cracking.

Moreover, by employing the apparatus and process according to the present invention only a relatively small amount of steam or another fluid is used for injecting a given quantity of liquid (hydrocarbons). In addition, coke formation on the catalyst particles and on the walls of the cracking apparatus is reduced as a result of optimal contacting of hydrocarbon feed with said catalyst particles.

The invention is illustrated by means of the following Example which is not intended to be construed as limiting the invention.

EXAMPLE

A feed stream of heavy hydrocarbon oil enters inlet (5) of the apparatus as depicted in FIG. 2 at a temperature of 250° C. and a pressure of 12 bar abs. and is mixed in tubular fluid supply means (1) having length of 3 m and a diameter of 0.2 m with steam introduced via inlet (4) at a temperature of 300° C. and a pressure of 15 bar abs. The resulting oil/steam mixture flows with a velocity of 50 m/s through annular outlet opening (12) into mixing zone (19), which is operated at a pressure of 3 bar abs. and a temperature of 520° C. Regenerated silica-alumina based catalyst particles are introduced via inlet (20) at a temperature of 700° C. into mixing zone (19) wherein the catalyst particles are contacted with the oil/steam mixture. The cracked product is thereafter passed to an outlet (not shown).

I claim as my invention:

1. A process for fluid catalytic cracking of a hydrocarbonaceous feed using an apparatus comprising:
   (i) an outer vessel having exterior walls, a lower portion and an upper portion and defining a mixing zone, said mixing zone having a fluidization gas inlet and a solids inlet in said lower portion of said vessel;
   (ii) a concentrically situated fluid supply means located within said vessel communicating with a hereinafter defined cooling zone comprising a lower portion and an upper portion, said lower portion having discreet hydrocarbonaceous feed inlet means and steam inlet means, said upper portion having outlet means concentrically disposed therein and a means for directing a mixture of fluids from said supply means to a hereinafter defined cooling zone; and
   (iii) an intermediate cooling zone in said vessel concentrically located exteriorly with respect to said supply means, said cooling zone having an upper portion having an outlet means and a lower portion having gas inlet means and comprising an annular communication with said mixing zone to provide for thermal insulation of said mixture of fluids from said supply means and means for subsequently deflecting and thereby directing said mixture of fluids into said outer vessel to be contacted with solids including a rotational-- symmetrical body having an increasing diameter as said body extends away from said supply means and into said outer vessel, wherein said process comprises:
   (a) contacting said hydrocarbonaceous feed with steam in said concentrically situated fluid supply means to form a mixture of feed and steam;
   (b) passing said mixture of feed and steam into said intermediate cooling zone;
   (c) passing said mixture of feed and steam from step (b) into said outer vessel and contacting said mixture in said outer vessel with fluidized solid cracking catalyst particles obtained by passing said solid catalyst particles into said outer vessel through said solids inlet and introducing fluidization gas into said outer vessel through said fluidization gas inlet, at a temperature in the range of from 0°–800° C. and a pressure in the range of from 1–100 bar abs. to form a cracked product; and
   (d) removing said cracked product from said outer vessel.

2. The process of claim 1 wherein said process is carried out at a temperature in the range of from 450°–550° C., and a pressure in the range of from 2–6 bar abs.

3. The process of claim 1 wherein the ratio of the mass flows of said solid catalyst and feed/steam is from 1–10 and most preferably from 4–8.

* * * * *